United States Patent [19]
Jones, III

[11] 3,879,891
[45] Apr. 29, 1975

[54] WINDOW PLANTER
[76] Inventor: John B. Jones, III, 48 Delle Ave., Roxbury, Mass. 02120
[22] Filed: July 27, 1973
[21] Appl. No.: 383,222

[52] U.S. Cl. ............................. 47/36; 47/40; 52/311; 206/45.34; 206/423; D35/3 A
[51] Int. Cl. ........................ A01g 9/02; B65d 25/54
[58] Field of Search .......... 47/36, 40, 17, 19; 52/63, 52/222, 74, 311; 98/96; 206/45.34, 78 B; 160/88

[56]   References Cited
UNITED STATES PATENTS
| | | |
|---|---|---|
| 628,589 | 7/1899 | Rudolf ................................ 52/311 |
| 1,817,494 | 8/1931 | McMann ............................. 160/88 |
| 2,247,947 | 7/1941 | Henderson ........................... 98/96 |
| 2,631,078 | 3/1953 | Watrous et al. .................. 206/45.34 |
| 2,887,824 | 5/1959 | Riva .................................. 206/78 B |
| 3,319,378 | 5/1967 | Andrews et al. ...................... 47/40 |

Primary Examiner—Edgar S. Burr
Assistant Examiner—Steven A. Bratlie
Attorney, Agent, or Firm—Breitenfeld & Levine

[57]   ABSTRACT

A window having an outwardly bulging light-transmitting central portion surrounded by a flange adapted to be supported in a window frame. A low wall joins the lower region of the outwardly bulging window portion to define a receptacle for soil.

6 Claims, 4 Drawing Figures

WINDOW PLANTER

This invention relates to windows, and in particular to a window incorporating a planter.

Most known plants require sunlight and water to survive and grow, and in order to supply the need for light, indoor plants are usually kept near a window in planters which contain soil for the plant to grow in. Water is periodically supplied to the soil. While some houses have window sills on which the planters may be rested to expose the planters to light, other houses do not, or the construction of the planter is such as to prevent its being rested on a window sill. Thus, in the absence of suitable window sills the planters must be located near a window so as to receive maximum possible amounts of natural light. Under these circumstances, planters take up floor space in a room which could be useful for other purposes.

Accordingly, it is an object of the present invention to provide a window planter which does not take up window sill or floor space.

Some houses are furnished with exterior window boxes filled with soil for plants. However, since window boxes are exposed to the weather, not all types of plants can be cultivated in them, and in many climates they can only be used for plant growing during a portion of the year.

It is therefore another object of the present invention to provide a window planter within which plants can receive as much light as in an exterior window box while being completely protected from the elements.

It is a further object of the invention to provide a window incorporating a planter such that on its exterior side the planter is completely closed while on its interior side access is provided for watering and otherwise caring for the plants.

Briefly, in a window structure having a frame, the invention comprises a planter comprising: a curved member defining a cavity, at least a portion of the member being transparent; a flange coupled to the edge of the curved member, the flange being adpated for support by the frame; and means coupled to the curved member for providing, in combination with the curved member, a soil support.

The above-mentioned and other objects and features of this invention will become apparent by reference to the following description and to the accompanying drawings, wherein.

Figure 1:
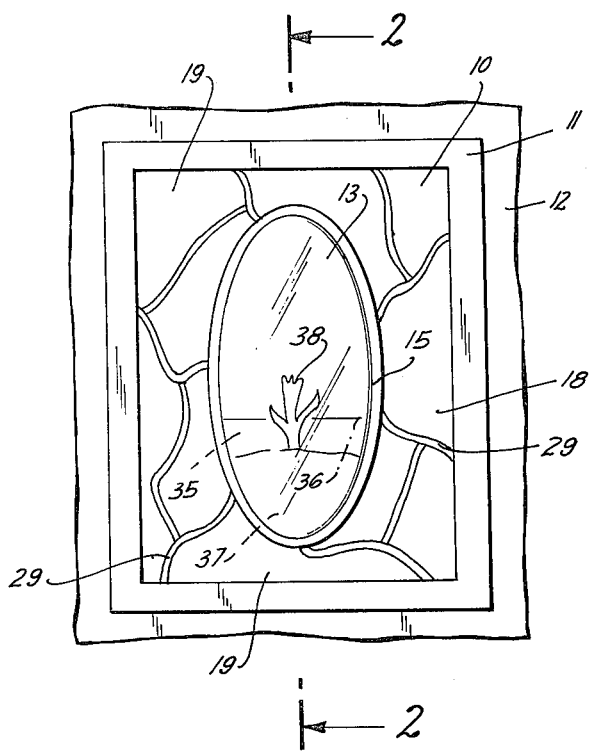
FIG. 1 is a partial front view of a house wall having a window planter, according to the invention.
Figure 2:
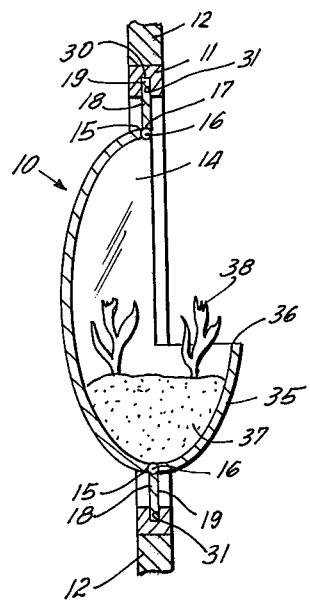
FIG. 2 is a cross-sectional view, taken along line 2—2 in FIG. 1.

FIGS. 1 and 2 show an embodiment of a window 10 incorporating a planter, according to the invention, supported, for example, by a rectangular window frame 11 set in the wall 12 of a house (not shown).

Window 10 includes a cen. al elliptical portion 13 having a convex shape so that it projects outwardly from the plane of the window frame 11 and defines a cavity 14 on its interior side. Window portion 13 is formed of any suitable transparent or translucent material capable of transmitting natural light needed by growing plants. The material may be glass or a plastic. The peripheral edge 15 of outwardly-bellied portion 13 lies in a single plane containing a flange 18 and is joined to the flange 18 in a fluid-tight manner. In this example, the flange 18 is a rectangular element composed of decorative sections 19 of stained glass or plastic joined together by lead seams 29 to provide fluid-tight connections. The flange 18 is joined to the periphery 15 of window portion 13 by a lead seam 16.

As shown in FIG. 2, the peripheral margin 30 of the flange extends into and is engaged, in a fluid tight manner, by a rectangular groove 31 in the frame 11. Thus, the frame 11 supports the flange 18 and the flange supports the elliptical window portion 13. The planter is formed in part by a wall 35 bellied inwardly from flange 18. Wall 35 has a curved upper edge 36 extending to a partially elliptical edge joined to flange 18 by lead seam 16. Wall 35 is a thin member formed, for example, from plastic, whose projection creates a volume which in combination with the lower part of the cavity 14 provides a receptacle in which soil 37 is supported. As shown in the drawings, wall 35 preferably has a height less than one-half the height of the convex portion 13. It should be noted that the area bounded by the upper part of the seam 16 above the edge 36 of wall 35 provides an opening which may be used to water and care for plants 38 in the soil 37 from the inside of the house.

Since the window portion 13 is light-transmitting and the various connections described are fluid tight, it may be seen that the plants 38 receive a maximum exposure to daylight while being protected from, for example, wind, rain, snow, etc.

Figure 3:
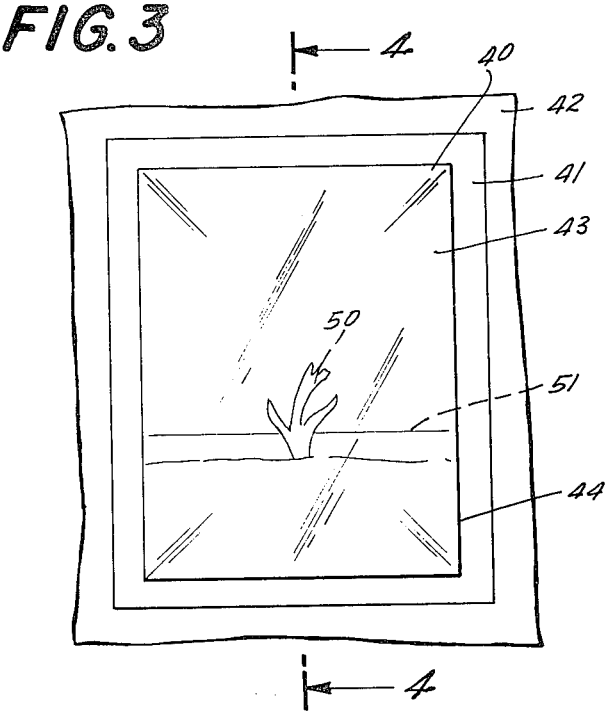
FIG. 3 is a partial front view of a house wall having another window planter, according to the invention.

The embodiment described above has a flange composed of individual joined sections and an outwardly-bulging planter portion. However, other shapes and constructions which use a window frame to support a planter may be provided according to the invention. For example, FIGS. 3 and 4 show another embodiment of a window 40, according to the invention, supported by a rectangular window frame 41 set in the wall 42 of a house (not shown).

Window 40 is a one-piece element of sheet material formed to define a large central outwardly-bulging portion 43 surrounded by a narrow flange 44. The sheet material may be any suitable transparent or translucent material such as glass or a plastic. Central portion 43 defines a cavity 45 on its interior side. As shown in FIG. 4, the flange 44 extends into and is engaged in a fluid tight manner by a rectangular groove 46 in the frame 41.

Extending from the lower portion of the periphery of bellied window portion 43 is a flat wall 47 arranged in this example in the plane of flange 44. If desired wall 47 could be curved similar to wall 35 or wall 35 could be flat as wall 47 is shown. The edge of wall 47 is joined to the periphery of window portion 43 by a water-tight seam 48. Thus, wall 47 and the lower portion of window portion 43 define a receptacle for soil 49.

Figure 4:
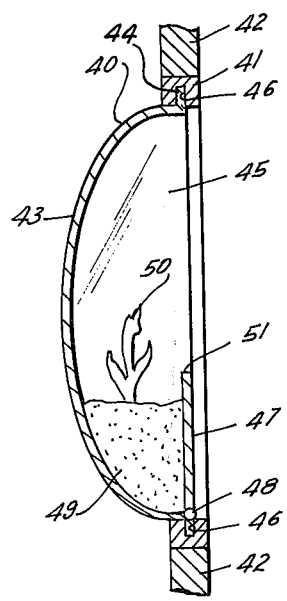
FIG. 4 is a cross-sectional view taken along line 4—4 in FIG. 3.

As shown in FIG. 4, the window 40 transmits light to plants 50 in the soil 49 while protecting the plants from inclement weather. Water may be supplied to the plants from within the house through an opening defined by the upper edge 51 of the wall 56 and the inner periphery of wall portion 43 above edge 51.

From the foregoing it may be seen, in general, that each of the window frames 11 and 41 support a flange 18 and 44, respectively, and that each of the flanges supports a curved transparent portion 13 and 43 used to provide a soil support, which is exposed to sunlight, as well as a weather shield. Thus, the window planter provides a healthy environment for plants. It should be noted that with this arrangement plants may be added to decorate a room of a house without taking up space in the room.

It is to be understood that the description herein of preferred embodiments according to the invention are set forth as an example thereof and are not to be construed or interpreted as limitations on the claims which follow and define the invention.

What is claimed is:

1. A window planter for use with a window structure having a frame, said window planter comprising:
    a. a convex central portion defining a cavity, at least a portion of said convex central portion being light-transmitting,
    b. a flange surrounding said convex central portion, said flange being in a single plane so that its edge may be supported in the window frame, and said flange joining said convex central portion along the periphery of the latter, and
    c. wall means having a height less than one-half the height of said convex central portion and joined to the lower region of said convex central portion to define a receptacle for soil in which plants can be planted, said wall means extending above the lowermost point of the periphery of said convex central portion.

2. A window planter as defined in claim 1 wherein said convex central portion projects from the plane of said flange in one direction, and said wall means projects from the plane of said flange in a direction opposite to the direction in which said convex central portion projects from said flange plane.

3. A window planter as defined in claim 1 wherein said wall means is coplanar with said flange.

4. A window planter as defined in claim 1 wherein said convex central portion and flange are formed integrally from one piece of material.

5. A window planter as defined in claim 1 wherein said flange comprises a plurality of individual flat elements joined along their edges to one another and to the periphery of said convex central portion.

6. A window planter as defined in claim 5 wherein said individual elements are stained glass.

* * * * *